United States Patent [19]

Raque et al.

[11] 4,249,560

[45] Feb. 10, 1981

[54] AUTOMATIC VALVE CLEAROFF

[76] Inventors: Glen F. Raque, 11107 Ainwick Ct.;
Edward A. Robinson, 8914 Pine Lake
Dr., both of Louisville, Ky. 40202

[21] Appl. No.: 24,579

[22] Filed: Mar. 28, 1979

[51] Int. Cl.³ .............................................. F16K 11/06
[52] U.S. Cl. ................................. 137/240; 137/625.48
[58] Field of Search ............ 137/238, 240, 244, 625.4, 137/625.48

[56] References Cited

U.S. PATENT DOCUMENTS

| 870,487 | 11/1907 | Bertram | 137/240 |
|---|---|---|---|
| 1,725,337 | 8/1929 | Burkhand | 137/240 |
| 2,037,873 | 4/1936 | Angell | 137/244 |
| 2,652,175 | 9/1953 | Davis | 137/240 |
| 3,716,069 | 2/1973 | Reynolds | 137/244 |

Primary Examiner—Martin P. Schwadron
Assistant Examiner—A. Michael Chambers
Attorney, Agent, or Firm—Edward M. Steutermann

[57] ABSTRACT

The present invention provides a valve arrangement including an elongate housing means defining a cylindrical valve chamber having a fluid inlet, and a fluid outlet where the fluid outlet is in longitudinal alignment with the housing and where the fluid inlet communicates with the side of the housing, slide valve means slidable within the housing from a first open position wherein the valve housing inlet communicates with the valve housing outlet, to a second, closed, position where the valve member is located to close off the valve inlet and one end of the valve member is disposed adjacent the outlet of the valve and where in some instances, the portion of the valve can extend through the outlet, valve operator means to operate the valve means between the first and second positions, and fluid supply means to supply a selected fluid to be metered to the valve inlet for emission from the valve outlet when the valve member is in the first position. Within the scope of the present invention, valve means can have fluid outlets in the first end and can be adapted so that a selected fluid, gas or liquid, is emitted from the outlets when the valve is in the second position to clean off the valve.

4 Claims, 3 Drawing Figures

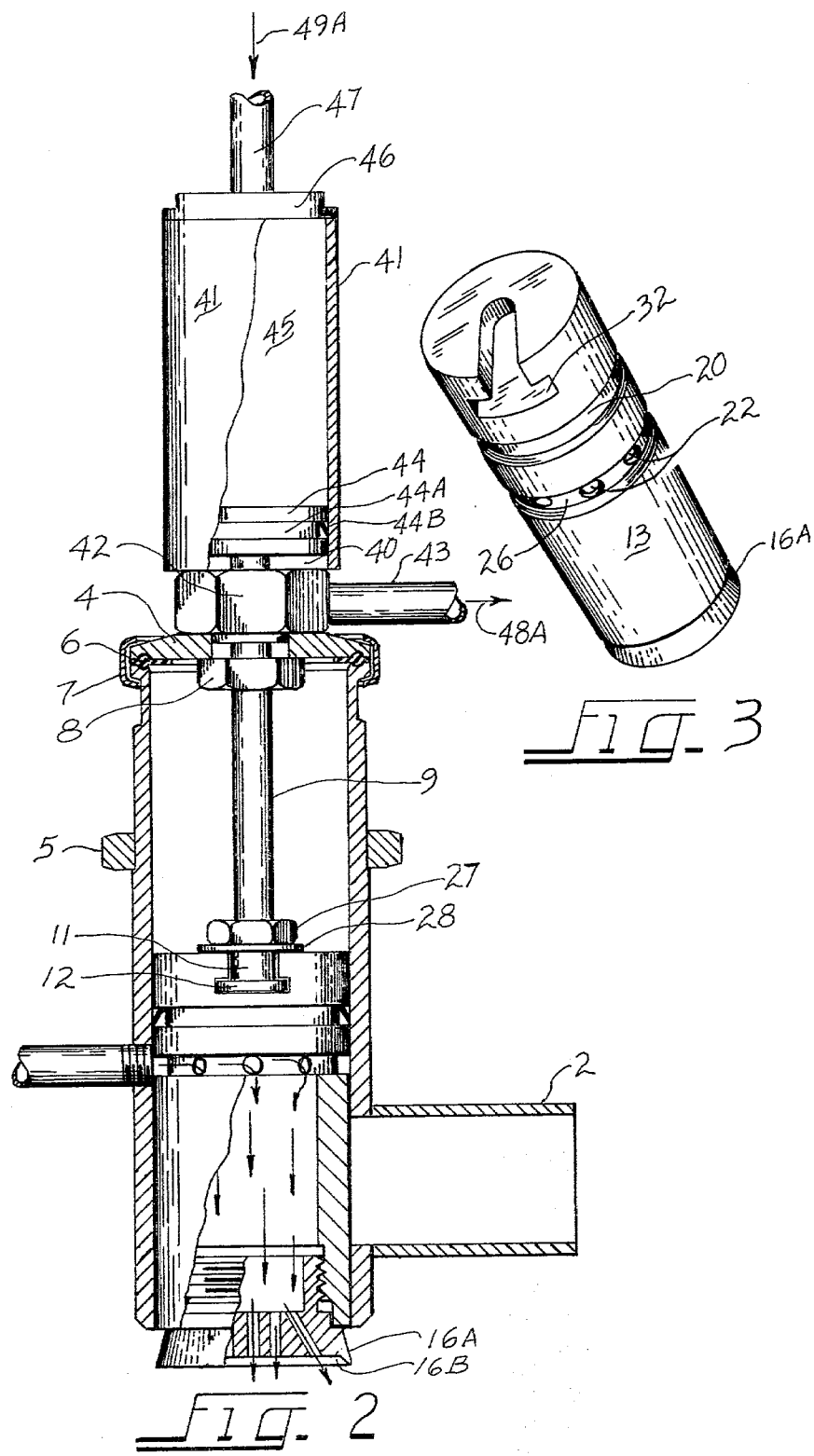

4,249,560

AUTOMATIC VALVE CLEAROFF

BACKGROUND OF THE INVENTION

The present invention relates to applications where valve-type devices are utilized to control the flow of a substance to be very carefully measured and where it is desirable to completely remove all of the substance from the valve between filling cycles.

In some instances, valves of this type are utilized in food processing and container filling arrangements where it is highly desirable to obtain an accurate cut-off in metering such materials.

Also, in many applications, particularly food metering operations, it is important that a metering valve arrangement provide a means to clear all material off the surfaces of the valve members contacting the material to prevent cross contamination and bacteriological growth within the substance being metered by completely removing all sources for such growth with each cycle of the metering valve.

In applications where metering valves are utilized in food processing or in the processing of other materials for human consumption, local, state and federal regulatory restrictions and the continuing strengthening and increasing scope of the restrictions necessitate the use of easily cleaned mechanical devices since many regulations impose severe restrictions on the handling of food and other materials for human consumption by human hands or the handling of such materials in open atmosphere.

Heretofore, various valve arrangements have been provided for metering the flow of various materials into containers where the valves have been of the arrangements generally known in the art, primarily, gate-type valves and ball valves.

Such valves have operated satisfactorily in many applications where the material to be metered is of relatively low viscosity. In such applications, the valve adequately meters the material and because of the low viscosity of the material, the clean-off of the valve is of little concern because the material drains from the valve.

However, in applications where such valves have been utilized in filling food containers with materials, such as mashed potatoes, applesauce or other highly viscous food products, such valves are not satisfactory because the material which clings to the valve after closure first adversely affects the weight of the material introduced into the container and secondly provides a site for the growth of bacteria.

Moreover, such prior art arrangements provided no means for post-operation valve cleanoff which would eliminate such problems.

In some applications where valves are utilized to meter the flow of food or other viscous material, arrangments are known where a wiper mechanism has been provided to wipe off the surface of the valve after closure. In such applications, the wiper mechanism has not been entirely satisfactory because the wiper is a mechanical device which first of all abrades and ultimately adversely affects the valve member itself, and secondly because of the mechanical nature of the wiper configuration, maintenance is from time to time required.

Additiionally, such wiper-type valves are generally complex in fabrication and expensive and even in simplest design do not adequately clean the valve of all substances between valve cycles.

SUMMARY OF THE INVENTION

The present invention provides a valve device which can be utilized in processing the most viscous materials including viscous liquids and food products.

Moreover, the present invention provides a valve arrangement which is straightforward in construction and economical in manufacture where the material in process through the valve member is entirely removed from the valve assembly and from all the surfaces of the valve member upon completion of each cycle of the valve.

Specifically, the present invention provides a valve member for use in accurately metering a stream of selected material, which can be viscous, the valve member can be adapted to wipe off the valve seat and urge the material being processed out of the valve body. Additionally, within the scope of the present invention, a compressed gas can be applied to the foremost surface of the valve member upon each closure of the valve member to remove all of the material being processed from the foremost surface of the valve.

Moreover, the present invention provides a valve arrangement where the valve member provides passageways extending to the foremost surface of the valve member and where a second fluid can be introduced through the passageways to the foremost surface for removal of the material being processed.

More particularly, the present invention provides a valve arrangement including a housing defining a cylindrical valve chamber having an outlet in longitudinal alignment with the chamber and an inlet in the side of the chamber, valve member means for longitudinal movement within the chamber and having at least one interior passageway having an inlet and an outlet communicating with a first end of the valve member, valve operator means to move the valve member within the valve chamber from a first position wherein the inlet to the valve chamber communicates with the outlet to the valve chamber, to a second position where the first end of the valve member is adjacent the valve chamber outlet and the valve member blocks the inlet to the valve chamber.

It is to be understood that various other arrangements within the scope of the present invention will become obvious to those skilled in the art upon reading the disclosure set forth hereinafter.

BRIEF DESCRIPTION OF THE DRAWINGS

Referring now to the drawings which illustrate one arrangement within the scope of the present invention:

FIG. 2 is a view of the valve arrangement shown in FIG. 1 with the valve member in closed position; and FIG. 3 is a perspective view, in isolation, of one valve member arrangment in accordance with the present invention.

Figure 1:
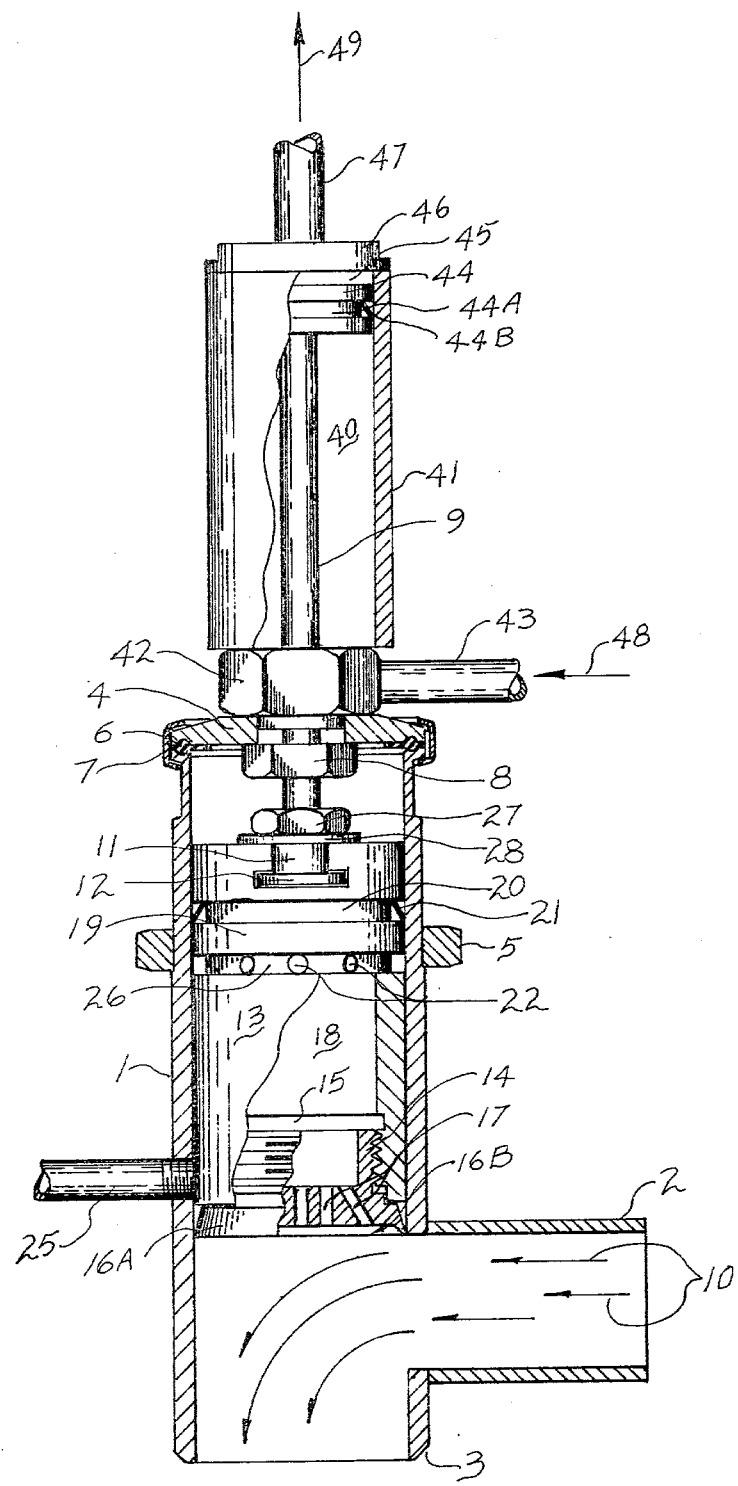
FIG. 1 is a plan view, partially in section, of a valve arrangement within the scope of the present invention illustrating the valve in open position.

Referring first to FIG. 1, the illustration shows a cylindrical valve housing 1, defining a cylindrical internal chamber. An outlet 3 is provided from housing 1 having a diameter equal to the diameter of housing 1 and where the outlet is in longitudinal alignment with the axis of the housing.

An inlet 2 is provided, as shown, communicating with the chamber defined within housing 1 where inlet 2 enters at a transverse relation to the chamber defined within housing 1.

Inlet 2 is connected to a source of material to be metered, for example, for the material shown by the arrows 10 where the source of material can be any selected source such as a pump hopper and the material can be any material which will flow, including, but not by way of limitation, food products.

A valve assembly 13, as shown in more detail in FIG. 3 and described hereinafter, is provided within the chamber defined by housing 1 and includes an annular ring 26 adjacent the upper end of the valve member 13 where inlet ports 22 and provided within the annular groove 26. Likewise, a sealing groove 20 is provided and adapted to receive a flexible seal 21, for example, Neoprene (Trademark, DuPont) or other type O-rings or to provide a seal between the inner surface of housing 1 and valve member 13.

Inlet ports 22 communicate with the inside of valve 13, which, as shown, is hollow and provides a plenum chamber 18.

In the example shown, the leading edge of valve member 13 is open and threaded and adapted to receive a plug 14, as shown. Within the scope of the present invention, a one-piece valve can be provided but in the arrangement shown, a valve with plug 14 is provided to facilitate cleaning and to allow the use of other outlet plugs to accomodate different type products. Valve 13 is adapted to accomodate the threaded portion of the thread and provides a recess 15 to fully accomodate plug 14.

Plug 14 is adapted to define the foremost or leading edge of valve member 13 so that the outer periphery of plug 14 engages the inner surface of housing 1 to wipe the surface clear of product. Plug 14, accordingly, insures most of the wear associated with operation of valve member 13, and as shown, can advantageously be replaceable to further extend the life of valve member 13.

In accordance with one feature of the present invention, plug 14 can include outlet ports 17 communicating with plenum chamber 18 of valve member 13 for emission of any fluid contained in chamber 18 as described hereinafter to clean off the end of the valve.

Within the scope of the present invention, plug 14 can further have a shoulder 16A extending out of valve member 13 where shoulder 16A can be tapered as shown and can further be provided with a recess 16B at the foremost or leading edge of valve member 13 as described hereinafter.

Valve 13 can be adapted for longitudinal movement within housing 1 and in the example shown, is provided with a connector assembly 11-12 to connect valve 13 to an operator arm 9 which extends through a cap provided in the upper end of housing 1. Cap 4 can be removable and can be retained on housing 1 by means of cooperative flanges and a clamp 7, shown in cross-section in FIG. 1, which can also be removable. Further, an over-lying seal 6 can be provided between cap 4 and the upper surface of housing 1, as shown.

Operator 9 can be connected to pneumatic cylinder 41, as shown, which can be attached to housing 1 where the operator means 9 is moved in response to movement of a piston 44 within operator 41 where piston 44 can, as is known in the art, include a sealing groove 44A adapted to receive a seal means, for example, an O-ring seal 44B. Fluid passageways for operator fluid passageways 43 and 47 are provided for pneumatic cylinder 41 where appropriate sources of fluid and sources of emission of operator fluid are provided by means not shown.

In the arrangement shown, the pressurized fluid, for example air, 48 is provided through inlet 43 to urge piston 44 upwardly thus moving valve member 13 to the open position, as illustrated, where a small chamber 45 is defined above piston 44 and beneath cap 46 provided for pneumatic operator 41.

In the arrangement shown in FIG. 1 with the valve assembly open, the fluid to be metered, as illustrated by the arrows 10, flows through inlet 2 and is emitted through outlet 3.

FIG. 2 is an illustration of the valve arrangement in closed position where pressurized operator fluid 49A is provided to a passageway 47 of pneumatic cylinder 41 and the fluid stream 48A is emitted from inlet 43 so that plunger 44 is urged downwwrdly taking pneumatic operator 41 with it, whereby operator arm member 9 is urged downwardly to position valve member 13 as shown. In the position shown in FIG. 2, leading edge 16A of valve member 13 extends out of inlet 3 of valve housing 1. In accordance with another feature of the present invention, annular groove 26 is in alignment with pressurized fluid inlet 25, for example, to admit a pressurized fluid such as air, to groove 22 so the pressurized fluid is admitted through inlet port 22 to flow into chamber 18 and out of chamber 18 through outlets 17 for removal of all material from the leading or foremost edge of valve member 13.

After removal of all the material from the leading or foremost edge of valve member 13, operator 41 causes retraction of valve member 13 for the next filling cycle by control means (not shown).

Referring now to FIG. 3 which illustrates an example of a valve arrangement shown in FIGS. 1 and 2, it will be noted that the groove 32 is provided and adapted to receive connector assembly 11 and 12. A portion of rod 9 can be threaded and adapted to receive a nut 27 and a washer 28 to securely position connector assembly 11 and 12 in groove 32 by compression.

In operation, valve member 13 is extended to the valve closed position shown in FIG. 2 and retracted to the valve open position shown in FIG. 1 to selectively emit the material being processed from the valve for a selected time period. The valve is then closed, as described hereinbefore, until, for example, the next container is in position to be filled.

In each downward stroke, plug 14 first cleans the inner surface of the chamber of housing 1 to remove food. When valve 13 has made its full downward travel, air is emitted through ports 17 to remove the food scraped by plug 14. It will further be noted that in the arrangement shown, air flows from ports 17 only so long as valve 13 is in the closed position. Upon upward movement of the valve, air flow to valve member 13 terminates. Accordingly, in the arrangement shown, it is not necessary to provide any actuator means for the cleanoff air stream emitted through outlet ports 17.

It will also be understood that while the foregoing description related to the use of air to be supplied to ports 17 to cleanoff valve plug 14, in certain applications other fluids, liquid or gas, can be utilized.

It is to be recognized that the foregoing is but one example of an arrangement within the scope of the present invention and that other arrangements, also within the scope of the present invention, will occur to those skilled in the art upon reading the disclosure set forth hereinbefore.

The invention claimed is:

1. A valve arrangement including an elongate housing means defining a first cylindrical valve chamber having a fluid outlet means in longitudinal alignment with the valve chamber, a fluid inlet means substantially perpendicular to said outlet means; slide valve means selectively slidable within said housing means from an open position where said valve inlet means and said valve outlet means are in communication through said housing means providing for the flow of a selected first fluid through said housing means to a closd position where said slide valve means closes off said valve inlet means to block flow of said fluid through said valve housing where a first end of said slide valve means closes said valve outlet means; wherein said slide valve means includes first fluid inlet means communicating with internal passageway means and outlet means in said first end of said valve means, said outlet means communicating with said passageway means for emission of a selected second fluid from said first end of said slide valve means to clear said first fluid from said first end of said slide valve means when said slide valve means is in said closed position and wherein said valve housing means includes fluid inlet supply means for supplying said second fluid adapted to be in aligned communicative relation with said first fluid inlet means of said valve means only when said valve member is in said closed position; said fluid inlet supply means being out of communication with said first fluid inlet means of said slide valve means when said slide valve means is in said open position, and valve operator means to operate said valve means between said open and closed position.

2. The invention of claim 1 wherein said first fluid inlet means to said slide valve means includes groove means around a portion of the periphery of said slide valve means with aperture means communicating with said passageway means.

3. The invention of claim 1 wherein said slide valve means includes plug means adjacent said first end of said slide valve means to scrape said first fluid means from the inside surface of said housing means when said valve means moves from said open position to said closed position.

4. The invention of claim 3 wherein said valve operator means includes a second chamber and a piston means said piston means defining piston chambers and including piston chamber inlet and outlet means, fluid pressure in a respective piston chamber reciprocates said valve operator means.

* * * * *